United States Patent Office 3,715,099
Patented Feb. 6, 1973

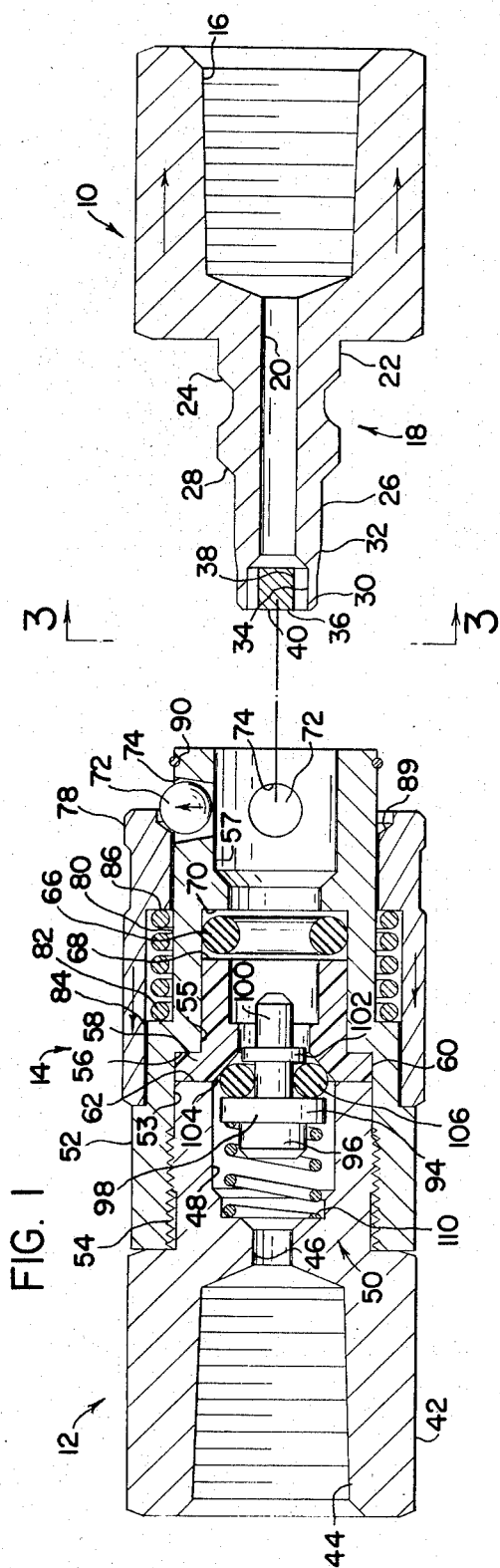
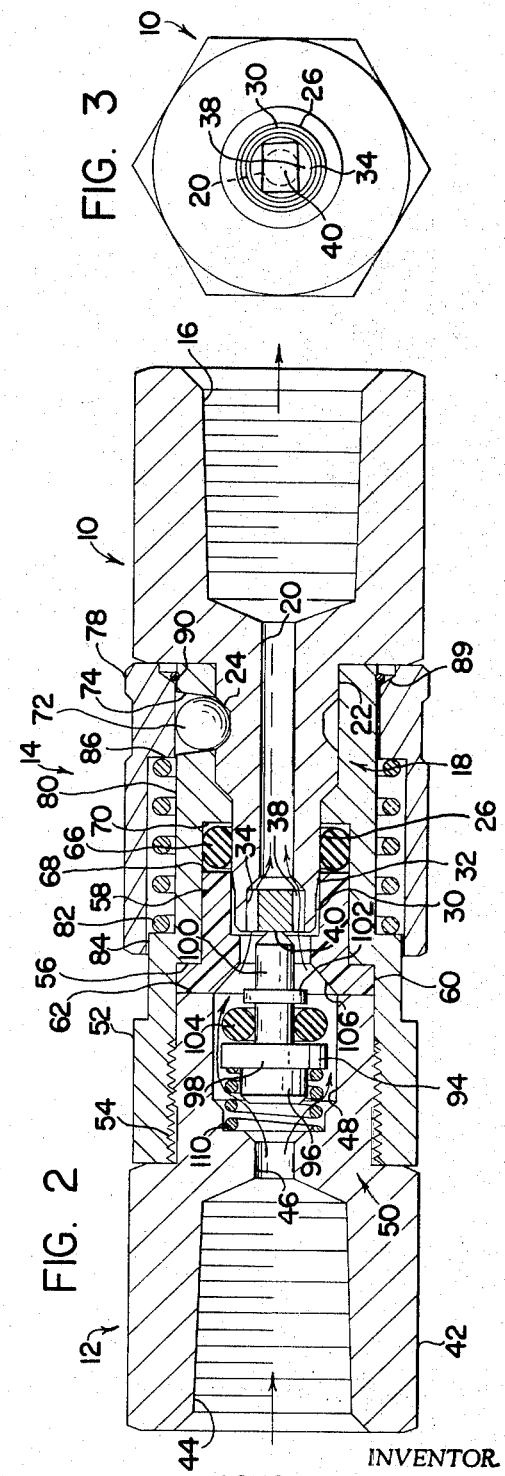

3,715,099
VALVED QUICK-DISCONNECT COUPLING
Ashok S. Shendure, Warrensville Heights, Ohio, assignor to Crawford Fitting Company, Solon, Ohio
Filed June 2, 1971, Ser. No. 149,162
Int. Cl. F16l 29/00, 37/28
U.S. Cl. 251—149.1                 1 Claim

ABSTRACT OF THE DISCLOSURE

The specification and drawings disclose a quick disconnect tube coupling which includes a female body member with an axially extending bore defining a flow passage and an internal valve chamber. A resilient sleeve member is positioned within the chamber and forms an annular valve seat. A male body member is associated with the female body member and includes a cylindrical stem portion of reduced diameter and a flow passage extending axially through the stem. The diameter of the stem is sized so as to be closely received within the bore of the female body portion. Positioned within the valve chamber and biased toward the seat and the stem is a plug valve member of stepped diameter with a reduced diameter portion that extends through the valve seat. The diameter of the plug's reduced diameter portion is substantially less than the diameter of the valve seat and the diameter of the end of the stem. The end of the stem is provided with flow passage openings which are located radially outward at a distance greater than the maximum diameter of the reduced diameter end portion of the plug member.

---

The subject invention is directed toward the tube coupling art and, more particularly, to an improved quick release coupling.

The invention is especially suited for providing small, short couplings and will be described with reference thereto; however, as will become apparent, the invention can be embodied in couplings of a wide range of sizes.

The typical prior art quick release coupling comprises mating male and female members which are connected and released through some type of detent arrangement. The female member has a through flow passage and generally carries an interval valve ball which is spring biased toward a seat mounted adjacent the outlet of the passage. The male member includes a stem which, when connected in the outlet, displaces the ball and maintains the flow passage open. Connecting flow passages through the stem and the male member provide a continuous flow passage through the coupling. It should be understood that seals must also be provided to seal about the stem when the coupling members are connected.

The above described coupling is generally satisfactory but does have disadvantages when an attempt is made to produce it in small sizes of short length. For example, the ball must, of course, have a diameter greater than the diameter of the opening through the seat. This controls not only the total diameter of the valve chamber but also its length. Moreover, the biasing spring must engage the ball on the face opposite the seat. Since the spring length must be sufficient to allow the desired movement of the ball and, also, to allow flow through the passageway when compressed, the total length of valve chamber required to accommodate both ball and spring is relatively fixed.

An additional problem present with the prior arrangement resides in the relationship between the ball, the stem, and the seat. In order that the stem can push the ball off the seat, the stem must be long enough and of small enough diameter to pass through the seat. Further, there must, of course, be an annular space between the outside of the stem and the seat. These factors tend to increase the diameter of the coupling, as well as the length.

In conjunction with the above disadvantages, the fluid flow path through the assembled coupling tends to be such as to produce relatively high pressure drops. For example, to provide flow communication in through the stem, small flow passages at nearly a right angle to the longitudinal axis must be used. Thus, fluid passing through the coupling is required to undergo substantial changes in direction.

The subject invention overcomes the above problems and provides a quick disconnect tube coupling which includes a female body member with an axially extending bore defining a flow passage and an internal valve chamber. A resilient sleeve member is positioned within the chamber and forms an annular valve seat. A male body member is associated with the female body member and includes a cylindrical stem portion of reduced diameter and a flow passage extending axially through the stem. The diameter of the stem is sized so as to be closely received within the bore of the female body portion. Positioned within the valve chamber and biased toward the seat and the stem is a plug valve member of stepped diameter with a reduced diameter portion that extends through the valve seat. The diameter of the plugs reduced diameter portion is substantially less than the diameter of the valve seat and the diameter of the end of the stem. The end of the stem is provided with flow passage openings which are located radially outward at a distance greater than the maximum diameter of the reduced diameter end portion of the plug member.

Preferably, and in accordance with a more limited aspect of the invention, the resilient sleeve which defines the valve seat includes a radially extending flange which is captured between separable sections of the female body member. The sleeve member thus provides a seal for the female body sections and eliminates the requirement for a separate body seal.

In accordance with another aspect, the invention contemplates that the end of the male stem will be solid and that the flow passage openings are located generally concentrically about the reduced diameter portion of the plug member.

By having the valve in the form of a stepped diameter plug with a portion extending through the valve seat, the distance which the valve member must be moved to shift from closed to open is reduced. This also allows the overall length of the coupling to be substantially reduced. Moreover, the arrangement of the plug and the stem flow openings assure a relatively smooth flow path through the valve.

A primary object of the invention is the provision of a quick disconnect coupling which can be made substantially shorter than prior couplings.

Yet another object is the provision of a valve of the type described having an improved internal valve-seat arrangement.

A still further object is the provision of a valve assembly for a disconnect coupling in which total valve movement is relatively short.

The above and other objects and advantages will become apparent from the following description when read in conjunction with the accompanying drawings wherein:

FIG. 1 is a longitudinal cross-sectional view of a quick release coupling formed in accordance with a preferred embodiment of the invention and showing the two halves of the coupling immediately prior to coupling;

FIG. 2 is a longitudinal cross-sectional view similar to FIG. 1 but showing the two halves in their coupled position; and, FIG. 3 is a view taken on line 3—3 of FIG. 1 showing the stem end of the male half of the coupling.

Referring more particularly to FIGS. 1 and 2, the coupling is shown as broadly including two main sections or halves 10 and 12 adapted to be manually engaged and disengaged through the use of an interconnecting ball-type detent arrangement 14. In the discussion which follows, section 10 will be referred to as the male section and section 14 as the female.

As best shown in FIG. 3, the male body section 10 is provided with a first end portion having a flow passage defining opening 16 shown with a standard pipe thread which provides means for connecting a hose, tubing or the like to the coupling. The particular type of connecting means utilized for attaching a line or tube to section 10 forms no part of the invention and could be of many types.

Extending outwardly from the opposite end of male section 10 is a stem portion 18 of somewhat reduced diameter and having a central, axial flow passage 20 formed therethrough and connecting with passage 16. The stem portion 18 is of stepped diameter and has a first major diameter portion 22 which is provided with a circumferential groove or recess 24. Groove or recess 24 is arranged and located so as to receive releasable detent means in a manner subsequently to be described. Immediately outward of the section 22 is a reduced diameter section 26 which joins with section 22 through an inclined face or shoulder 28. The outer terminal end portion of the stem 18 is of still slightly smaller diameter as shown at 30 and joins with section 26 through a tapered or inclined face 32.

As best shown in FIG. 3, the end portion 30 is counter-bored as shown at 34 to a diameter slightly larger than the diameter of the flow passage 20. A rectangular insert member 36 is fitted within the counter-bore 34. As seen in FIG. 3, the insert defines a plurality of flow passages 38 about its periphery. Flow passages 38 permit fluid flow through the stem while providing a solid center face section 40 at the end of the stem. Although not previously mentioned, the insert member 36 is preferably press fitted into the counter-bore 34 so as to be tightly maintained therein. As best shown in FIG. 2, passages 38 are located radially of the longitudinal axis at a distance slightly greater than the diameter of portion 100 of the valve plug. This provides a relatively smooth flow passage from the valve chamber into the stem.

Directing ones attention to the female body section 12, it will be noted that it comprises a first section 42 having a threaded opening 44 extending inwardly from the left end thereof (as viewed in FIGS. 1 and 2). Opening 44 merely provides means for connecting the body section to a pipe, tube or other flow line and the particular connecting arrangement provided forms no part of the subject invention. Extending inwardly from the inner end of opening 44 is a smaller diameter opening 46 which communicates with a larger diameter counter-bored opening 48 formed inwardly from the right-hand end of section 42. Opening 48 forms a valve chamber for the valve assembly 50 which will subsequently be described in detail.

Connected to portion 42 is an adaptor or sleeve member 52 which has an internally threaded end portion 54 which is received on cooperating external threads formed on the right-hand reduced diameter end portion of section 42. As shown, sleeve member 52 has a stepped opening formed therethrough and including sections 53, 55, and 57 which form shoulders 56 and 70.

The sleeve member 52 and the first body portion 42 cooperate to define the internal valve chamber and, also, to clampingly hold a resilient, valve seat defining insert member 58. Member 58 is formed from any resilient material having suitable properties for the material being handled by the coupling and has a shape generally as shown. As can be seen, insert member 58 has an outwardly extending flange portion 60 which is clampingly received between the shoulder 56 and the end face 62 of the first body portion 42. The outer diameter 58 of the reduced diameter portion of the insert is closely received within the bore 55 of sleeve 54. As shown, an O-ring member 66 is positioned between the end face 68 of the insert and an inner shoulder 70 formed in the sleeve member 52.

As can be seen in FIG. 2, the O-ring 66 has an inner diameter less than the outer diameter of portion 26 of stem 18. Thus, when assembled, a fluid tight seal is provided between stem 18, and the female body section 12.

In order to maintain the coupling releasably interconnected and the O-ring in proper sealing engagement, a detent assembly 14 is interposed between the two coupling sections. As shown, the detent assembly includes a plurality of ball members 72 (three, for example) positioned in tapered openings 74 formed in the outer end of sleeve member 52. In their radial inward positions, the balls are arranged to engage in the groove 24 and lock the coupling halves 10 and 12 together. The balls are maintained in their radial inward positions by a sleeve or retaining member 78 carried on the reduced diameter portion 80 of member 52. The sleeve 78 is maintained biased outwardly on member 54 by a compression spring 82 which is positioned between shoulder 84 and the interior shoulder 86 of member 78. A snap ring 89 is positioned in groove 90 formed about the outer end of member 54. The snap ring prevents the sleeve member 78 from being moved outwardly of the member 52 under the influence of spring 82.

When it is desired to release the coupled sections 10 and 12, the sleeve 78 can be manually slid to the left (as viewed in FIG. 2) to the position shown in FIG. 1. This releases the balls 72 and permits them to move radially outward from the openings 74 (see FIG. 4). The groove 24 is preferably contoured so that the balls are cammed outwardly.

Of particular importance to the subject invention is the arrangement of the valve assembly 50 which is adapted to open automatically upon connection of the coupling and to close off the flow through section 12 whenever the coupling is disconnected. As discussed, prior to the subject invention, it was conventional to use a ball-type valve member in the chamber. The subject invention however, is arranged to provide a more satisfactory flow passage while permitting the overall length of the assembly to be reduced. Specifically, the valve member comprises a plug-type valve member 94 having a first body portion 96 which includes an outwardly extending collar or flange section 98. Extending rightwardly from the body portion 96 is a reduced diameter stem portion 100. The stem portion 100 includes a generally centrally located collar or flange 102. Positioned between flange 94 and flange 102 is an annular, resilient O-ring 104. It will be noted that the outer diameter of the O-ring 104 is substantially larger than the inner diameter of the insert 58. Additionally, it can be seen that when the plug member 94 moves to the right, the O-ring 104 sealingly engages the inclined seat surface 106 of the insert 56.

A compression spring 110 is positioned between the left-hand side of the flange 98 and the shoulder surrounding the bore 46. Thus, the plug member 94 is continually maintained under a rightward bias. Consequently, when the coupling sections are disengaged (as shown in FIG. 1), the plug member 94 is moved to the right until the O-ring 104 is firmly and tightly seated against the inclined seat surface 106. This provides a tight fluid seal to prevent flow through the coupling section 12. However, when the couplings are assembled as shown in FIG. 2, the end portion of stem 100 is engaged by the solid center section 40 of the insert 36 in stem 18. Thus, when assembled, the plug valve assembly 50 is in an open position and flow can take place from the coupling section 10 through to the coupling section 12. It should be noted that the compression spring 110 has a length such that when the coupling is assembled, as shown in FIG. 2, the spring does not go solid and substantial space remains between the convolutions. This permits fluid flow through the spring as shown by the arrows.

As shown by the arrows in FIG. 2, the shape of the plug valve is such that, in combination with the openings 38 defined by insert 36, a smooth flow path is provided through the body. Because of the smooth flow about the plug valve, no problems are experienced with chatter of shifting of the valve.

As can be appreciated, with the coupling having the described arrangement, changing of the insert 58 or the O-ring 104 is extremely simple. Note that merely by unthreading the sleeve 52 from the body 42, the major portion of the assembly can be removed and changed, if necessary. Moreover, the sleeve of insert 58 not only forms the valve seat but also provides a seal between the separable sections of the female body member. An additional feature to be noted is that the combination of the plug-type valve member with the reduced diameter portion extending through the valve seat reduces the total length of the assembly and allows the length of the male stem member to be somewhat shorter than with a conventional ball-type valve member. Further, the length of the valve chamber can be somewhat less and the same total flow area provided.

The invention has been described in great detail sufficient to enable one of ordinary skill in the coupling art to make and use the same. Obviously, modifications and alterations of the preferred embodiment will occur to others upon a reading and understanding of the specification and it is my intention to include all such modifications and alterations as part of my invention insofar as they come within the scope of the appended claim.

What is claimed is:
1. A quick disconnect tube coupling comprising:
   a female body member having an axially extending bore defining a flow passage and an internal valve chamber, means defining an annular valve seat within said chamber and including a resilient sleeve member having a radially extending flange captured within said bore adjacent said valve chamber;
   a male body member having a cylindrical stem terminating in an end portion of reduced diameter and a flow passage extending axially through said stem, the diameter of said stem being arranged to be closely received within said bore of said female body portion;
   a plug valve member positioned within said valve chamber and biased toward said seat and said stem, the plug member being of stepped diameter with a reduced diameter portion extending through said valve seat, the diameters of said plug being substantially less than the internal diameter of said valve chamber to provide flow passage space completely about said plug, an O-ring member received on said plug and having an outer diameter less than the internal diameter of said chamber but larger than the internal diameter of said seat, the diameter of the reduced diameter end portion of said plug being less than the diameter of the end of said stem; and,
   the end of said stem having a solid center and a plurality of axially extending flow passage openings located radially outward of the axis at a distance greater than the maximum diameter of the reduced diameter end portion of said plug member and less than the inner diameter of said seat, whereby fluid can flow substantially axially between said male and said female body members.

References Cited
UNITED STATES PATENTS

| | | | |
|---|---|---|---|
| 2,327,611 | 8/1943 | Scheiwel | 251—149.6 X |
| 2,890,718 | 6/1959 | Smith | 251—149.4 X |
| 3,378,225 | 4/7968 | Snyder, Jr. | 251—149.6 |
| 3,583,667 | 6/1971 | Amneus, Jr. | 251—149.6 X |
| 207,432 | 8/1878 | Moffitt | 251—149.1 |
| 2,968,497 | 1/1961 | Treleman | 251—149.4 |
| 3,170,667 | 2/1965 | Szohatzky | 251—149.6 |

WILLIAM R. CLINE, Primary Examiner

U.S. Cl. X.R.

251—149.6